United States Patent [19]

Streetman

[11] Patent Number: 5,758,725
[45] Date of Patent: Jun. 2, 1998

[54] METHOD AND DEVICE FOR ENHANCING OIL AND GAS FLOW IN A WELL

[76] Inventor: Foy Streetman, P.O. Box 1984, Chickasha, Okla. 73023

[21] Appl. No.: 643,800

[22] Filed: May 6, 1996

[51] Int. Cl.$^6$ ............................................. E21B 43/22
[52] U.S. Cl. ........................ 166/304; 166/117; 166/310; 166/902
[58] Field of Search ................... 166/310, 304, 166/902, 243, 117

[56] References Cited

U.S. PATENT DOCUMENTS

| | | |
|---|---|---|
| Re. 23,583 | 11/1952 | Eilerts ............................ 166/310 X |
| 161,190 | 3/1875 | Young . |
| 434,035 | 8/1890 | Warner et al. . |
| 982,246 | 1/1911 | Centala . |
| 1,210,704 | 7/1917 | Schubert . |
| 1,879,226 | 9/1932 | Heddy . |
| 2,437,475 | 3/1948 | Oxford, Jr. ................... 166/902 X |
| 2,544,728 | 3/1951 | Safford . |
| 2,708,566 | 5/1955 | Caldwell . |
| 2,728,400 | 12/1955 | Rohrback ...................... 166/243 |
| 3,180,418 | 4/1965 | MacLeod ...................... 166/902 |
| 3,348,611 | 10/1967 | Reisberg . |
| 3,593,800 | 7/1971 | Hutchison . |
| 3,603,398 | 9/1971 | Hutchison . |
| 3,700,034 | 10/1972 | Hutchison . |
| 4,164,257 | 8/1979 | Anthony et al. ............... 166/902 |
| 4,611,664 | 9/1986 | Osterhoudt, III et al. ....... 166/902 |
| 4,790,386 | 12/1988 | Johnson et al. ................ 166/310 |
| 5,095,977 | 3/1992 | Ford ............................. 166/902 |
| 5,249,844 | 10/1993 | Gronseth ....................... 299/17 |
| 5,413,184 | 5/1995 | Landers ......................... 175/62 |

*Primary Examiner*—Hoang C. Dang
*Attorney, Agent, or Firm*—R. William Graham

[57] ABSTRACT

A method and device for increasing oil and gas recovery include connecting an oil and gas flow enhancing stick to a weighted plunger to speed the decent of the stick to the bottom of a well, which optionally includes a retrieving member to retrieve the plunger from the well.

20 Claims, 1 Drawing Sheet

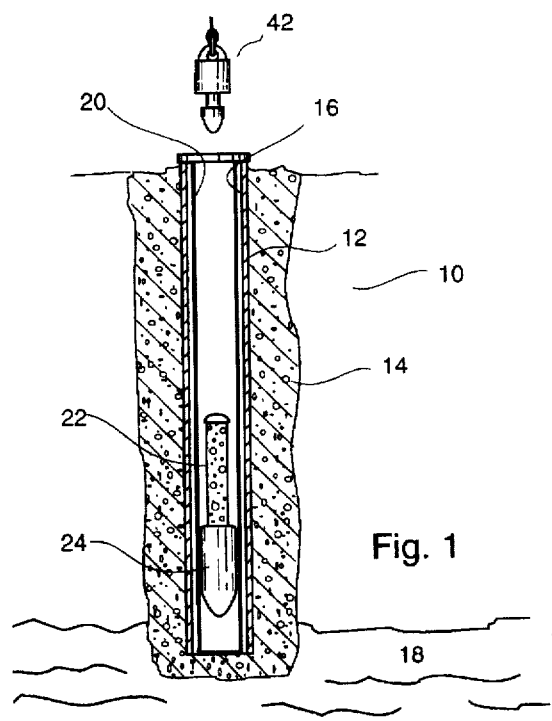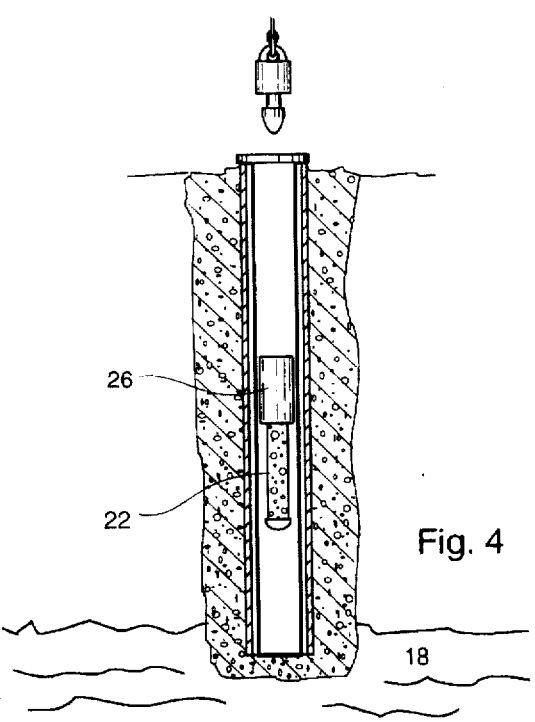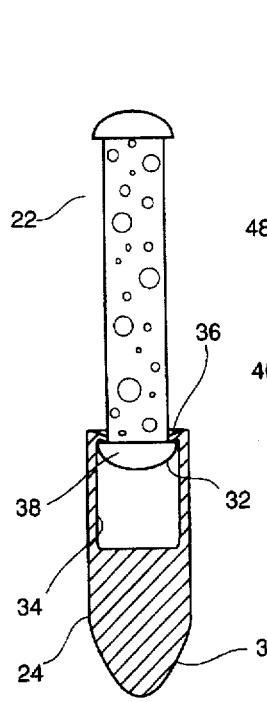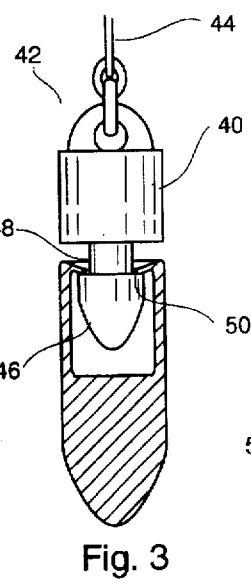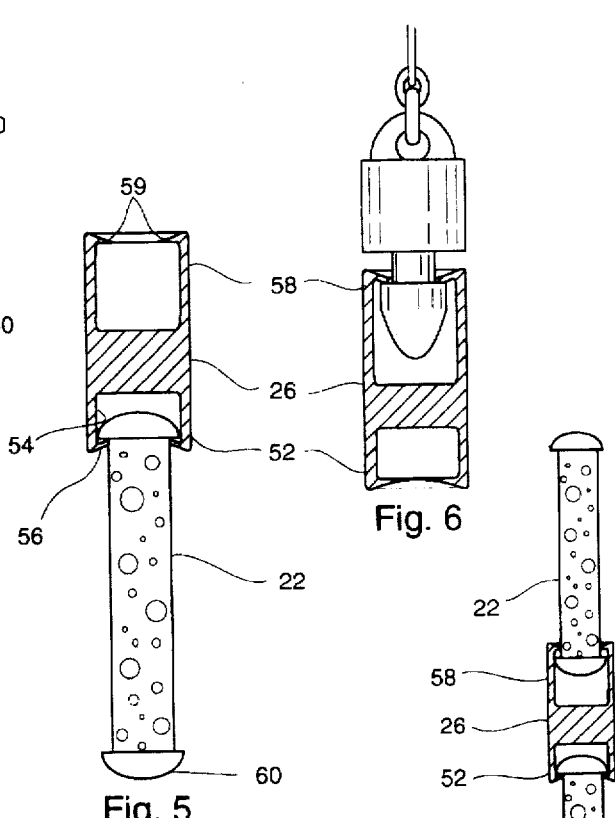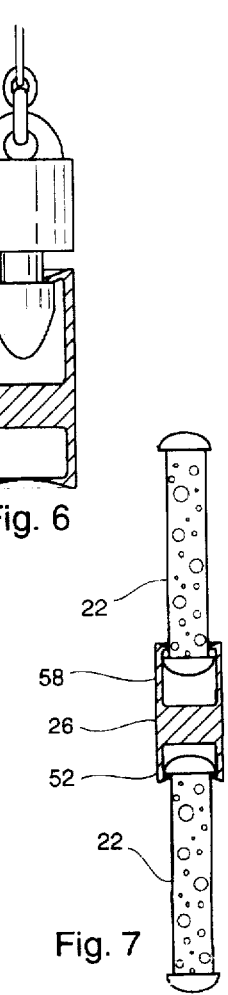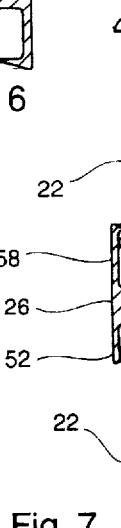

METHOD AND DEVICE FOR ENHANCING OIL AND GAS FLOW IN A WELL

BACKGROUND OF THE INVENTION

1. Field of the Invention

The present invention relates to a method and device for increasing oil and gas recovery, and more particularly, but not by way of limitation, to a use of an oil and gas flow enhancing stick and plunger to speed the rate in which the stick can be delivered into the bottom of the well.

2. Related Art

In the recovery of oil from oil-bearing reservoirs, it is often possible to recover only a portion of the oil contained in the underground formation by the so-called primary recovery methods which utilize the natural forces present in the reservoir. Thus, a variety of enhanced recovery techniques, so-called secondary or tertiary recovery has been employed in order to increase the recovery of oil from subterranean reservoirs.

Chemical activated oil and gas flow enhancing liquids and sticks, such as soaps, are commonly known to reduce scale, paraffine and the viscosity of the fluids in the well and thus increase production of oil and gas recovery. Enhanced recovery techniques presently use a pump truck to pump a slurry mix either "in liquid form" of soap into the oil well either at the well head or through a special inner tubing which extends to the bottom of the hole or "in solid form" by dropping a soap stick into the well tubing.

These techniques have proved somewhat effective in enhancing oil recovery, but each has drawbacks. The liquid soaps require the use of additional equipment such as pump trucks to effectuate delivery of the soaps as well as building inner tubing to deliver the soap where the soap is most needed, i.e., at the bottom of the well. Delivery using such methods are not econcomically practical due to the use of additional equipment and costs associated therewith.

Soap sticks are more economically practical, but lack effectiveness as the soap sticks dissolve either too slowly upon reaching the well bottom or too quickly prior to reaching the well bottom. The length of time it takes for the stick to reach the bottom of the well depends upon well depth, viscosity of fluid, the reactivity of the chemical stick to fluid environments as well as internal chemical release and aerodynamics of the stick shape. Due to the chemical nature of these chemical activated oil and gas flow enhancing sticks, they have a relatively limited mass or density advantage in the mass and density compared to the fluids in which they are placed and thus are limited in the rate in which they fall to the bottom of the well. In other words, by adding compositions to the sticks to increase their mass and density to decrease their time of decent, the reactivity of the stick is negatively impacted.

There remains a need for an economically practical and effective method of enhancing oil recovery. There also remains a need for maintaining a relatively high activity rate of chemical activated oil and gas flow enhancing sticks while increasing the speed in which such sticks are delivered to the bottom of the well.

SUMMARY OF THE INVENTION

An object is to improve secondary oil and gas recovery using a novel method and device.

Another object is to increase oil and gas production in a more economical manner.

Accordingly, the present invention is directed to a device for increasing oil and gas recovery, including an oil and gas flow enhancing stick and a weighted plunger device having means for retaining the stick. The device optionally includes means for retrieving the plunger device.

The method of the present invention includes connecting an oil and gas flow enhancing stick to a weighted plunger and dropping the plunger with a stick attached thereto down a well. The method may further include disconnecting the stick from the plunger and retrieving the plunger from the well.

By so providing, the present invention enables chemical activated oil and gas flow enhancing material delivery in an improved manner without substantial costs of additional equipment. In doing so, improved oil and gas recovery is obtained due to increased speed in which the stick travels to the bottom of the well and ability to design the stick to dissolve quicker and easier.

Other objects and advantages will be readily apparent to those skilled in the art upon viewing the drawings and reading the detailed description hereafter.

BRIEF DESCRIPTION OF THE DRAWINGS

FIG. 1 is a longitudinal cross section of typical well having a plunger and an oil and gas flow enhancing stick of the present invention therein.

FIG. 2 is a cross section of side view of the plunger of FIG. 1 and the chemical activated oil and gas flow enhancing stick of the present invention therein.

FIG. 3 is cross section of the plunger of FIG. 1 and a retrieving member of the present invention.

FIG. 4 is a longitudinal cross section of typical well having another plunger and an oil and gas flow enhancing stick of the present invention therein.

FIG. 5 is a cross section of side view of the plunger of FIG. 4 and the chemical activated oil and gas flow enhancing stick of the present invention therein.

FIG. 6 is cross section of the plunger of FIG. 4 and a retrieving member of the present invention.

FIG. 7 is a cross section of side view of the plunger of FIG. 5 having chemical activated oil and gas flow enhancing sticks in the top and bottom of the plunger.

DETAILED DESCRIPTION OF THE PREFERRED EMBODIMENT

Referring to the drawings, FIGS. 1 and 4 show a typical well 10 having a well bore surface 12 drilled into the earth 14. Typical well string casing 16 exists within and against the well bore surface 12 and extends into the earth 14 to a gas and/or oil zone 18. A tubing string 20 is operably installed within the string casing 16 through which the gas and oil flow. A conventional Christmas tree (not shown) is connected to the top of the tubing string 20.

An oil and gas flow enhancing stick 22 is shown in FIGS. 1, 2, 4, 5 and 7 as being connected to a plunger 24 in FIGS. 1 and 2 and another plunger 26 in FIGS. 4, 5 and 7. The oil and gas flow enhancing stick 22 can be, for example, a solid form of microorganisms which enhances oil recovery production or a liquid form of microorganisms encapsulated in a gel cap shell which is consumed by the microorganism placed therein. The stick can include scale inhibitors, corrosion preventers, paraffin solvents, foaming agents and/or gas expansion agents.

The structure or form of the stick 22 should be to enable retention thereof by the plunger 24 or 26. The material of the stick 22 is a function of the type of the application for which it is to be used. For treating against corrosion, a polyvinyl alcohol might constitute a shell containing a corrosion inhibiting acid based chemical wherein the shell would be digested within minutes, depending upon its thickness. Thickness of the wall can be made according to the time it takes the plunger 24 or 26 and associated stick 22 to reach the bottom of the well 10. The time is determined as a function of the viscosity of the fluid through which it moves, its mass and the depth of the well.

As shown in FIGS. 1–3, the plunger 24 has a first end 30 which is generally conical with a rounded end to provide suitable aerodynamics. A second end 32 has an inner open surface 34 and resilient retention fingers 36 which extend radially inward.

The stick 22 has an end 38 which is slightly larger than a distance between the retention fingers 36 but slightly less than the diameter of the inner open surface 34 of the second end 32. In this regard, the end 38 of the stick 22 can be deformably press fit into the open surface 34.

The well 10 is conventionally equipped with a valve mechanism to open and shut the well fluid flow as is known in the art. The plunger 24 with connected stick 22 is dropped into the tubing 20 while the well 10 is open, then the well is shut. The plunger 24 with its connected stick 22 falls to the lowest point of the well bore 12 where the stick 22 is designed to begin chemically reacting releasing the oil and/or gas flow enhancing agent thereby maximizing delivery thereof at the most desired point, i.e., the agent is delivered at the oil and/or gas zone.

In the event the plunger 24 remains in the tubing 20, a retrieving member 40 may be used to retrieve the plunger 24. The retrieving member 40 has one end 42 with eyelet means for attaching a retrieving line 44 which is operably disposed at the surface of the earth 14. The other end 46 is conical with a rounded end for reasons previously stated and is of a diameter slightly greater than the distance between the retention fingers 36 but less than the diameter of the inner open surface 34. A relatively small diameter collar portion 48 interconnects the ends 40 and 46. A shoulder 50 formed between the end 46 and the collar 48 acts as catch against the fingers 36 when the end 46 is disposed within the inner open surface 34. Upon reaching the surface, the retrieving member 42 can be forcibly removed the plunger 24.

The plunger 26 depicted in FIGS. 4–7 is an alternative embodiment having one end 52 with an inner open surface 54 and retention fingers 56 which extend radially inward. The plunger has another end 58 having an inner open surface 60 with retention fingers 62 and is similarly designed to connect to retrieving member 40 as discussed above and can optionally be used to carry two sticks 22 as shown in FIG. 7. In this regard, a stick 22 having a gas expansion agent may be disposed in the bottom of the plunger 26 to aid in lifting the plunger and a foaming agent in a stick 22 in the top to lighten the fluid above.

Likewise, the stick 22 is retained in end 52 or by retention fingers 59 in end 58 in a similar manner as previously discussed with respect to end 32 of plunger 24. Here, the stick 22 is formed with a rounded end 60. As seen in FIG. 4, the plunger 26 acts as a driving force when inserted into the tubing 20 with the stick 22 leading their decent.

While the preferred embodiment of the present invention is illustrated and described, it is to be understood that this is capable of variations and modifications and therefore, the applicant does not wish to be limited to the precise details set forth, but desires to avail himself of such changes and alterations as fall within the purview of the following claims.

What is claimed is:

1. A device for increasing oil and gas recovery in a well by enhancing oil and gas flow therein, including:
   at least one oil and gas flow enhancing stick which is characterized to include a solid outer material and be one of oil and gas soluble; and
   a weighted plunger having means for retaining said stick, said retaining means engaging one end of the stick such that a majority of the stick's outer surface is exposed to the oil and gas flow in the well.

2. The device of claim 1, wherein said retaining means includes an end of said plunger having an inner open surface extending axially therein and said end having a retention finger portion extending radially therein which retains an end of said stick in a manner such that a remaining portion of said stick is disposed outside said plunger.

3. The device of claim 2, which further includes means cooperating with said finger for retrieving said plunger.

4. The device of claim 3, wherein said retrieving means includes an extendable retractable line and a retrieving member connected to said line and having an end formed in a manner to be connectably recieved within said end of said plunger.

5. The device of claim 1, wherein said stick includes at least one of scale inhibitors, corrosion preventors, paraffin solvents, foaming agents and gas expansion agents.

6. The device of claim 1, wherein said stick includes a combination of at least two of a group including scale inhibitors, corrosion preventors, paraffin solvents, foaming agents and gas expansion agents.

7. The device of claim 1, wherein said outer material includes polyvinyl alcohol.

8. A device for increasing oil and gas recovery in a well by enhancing oil and gas flow therein, including:
   at least one oil and gas flow enhancing stick which is characterized to include a solid outer material and be one of oil and gas soluble;
   a weighted plunger having means for retaining said stick, wherein said plunger further includes an end having an inner open surface extending axially therein and said end having a retention finger portion extending radially therein which retains an end of said stick in a manner such that a remaining portion of said stick is disposed outside said plunger and another end having an inner open surface extending axially therein and said another end having a retention finger portion extending radially therein.

9. The device of claim 8, wherein said stick has a portion of an end thereof retained in said end of said plunger wherein a remainder of said stick remains substantially exposed.

10. The device of claim 9, wherein said stick has another end which is rounded.

11. The device of claim 8, which further includes means for retrieving said device.

12. The device of claim 11, wherein said retrieving means includes an extendable retractable line and a retrieving member connected to said line and having an end formed in a manner to be connectably received within said another end of said plunger.

13. The device of claim 8, wherein a first stick has a portion of an end thereof retained in said first end of said plunger wherein a remainder of said first stick remains substantially exposed and a second stick has a portion of an end thereof retained in said second end of said plunger wherein a remainder of said second stick remains substantially exposed.

14. The device of claim 8, wherein said stick includes at least one of scale inhibitor, corrosion preventors, paraffin solvents, foaming agents and gas expansion agents.

15. The device of claim 8, wherein said stick includes a combination of at least two of a group including scale inhibitors, corrosion preventors, paraffin solvents, foaming agents and gas expansion agents.

16. The device of claim 8, wherein said outer material includes polyvinyl alcohol.

17. A method for enhancing oil and gas flow in a well, which includes the steps of:

connecting one end of an oil and gas flow enhancing stick to a weight plunger such that a majority of the stick's outer surface is exposed to the oil and gas flow in the well and wherein said stick is characterized to include a solid outer material and be one of oil and gas soluble; and dropping said plunger with said stick attached thereto down the well.

18. The method of claim 17, which further includes retrieving said plunger from the well.

19. The method of claim 17, wherein said stick includes at least one of scale inhibitors, corrosion preventors, paraffin solvents, foaming agents and gas expansion agents.

20. The method of claim 17, wherein said outer material includes polyvinyl alcohol.

* * * * *